(No Model.)

C. J. VAN DEPOELE.
ELECTRO DYNAMIC MOTOR.

No. 362,798. Patented May 10, 1887.

Witnesses
H. A. Lamb.
G. W. Campbell.

Inventor
Charles J. Van Depoele.
By his Attorney
Frankland Jamres

UNITED STATES PATENT OFFICE.

CHARLES J. VAN DEPOELE, OF CHICAGO, ILLINOIS.

ELECTRO-DYNAMIC MOTOR.

SPECIFICATION forming part of Letters Patent No. 362,798, dated May 10, 1887.

Application filed October 19, 1886. Serial No. 216,603. (No model.)

*To all whom it may concern:*

Be it known that I, CHARLES J. VAN DEPOELE, a citizen of the United States, residing at Chicago, in the county of Cook and State of Illinois, have invented certain new and useful Improvements in Electro-Dynamic Motors, of which the following is a specification, reference being had therein to the accompanying drawings.

My invention relates to a new and useful improvement in electro-dynamic motors; and it consists in a special method of winding the field-magnets of such motors, whereby an electric motor is produced capable of running with a constant speed under a variable load.

The details of the invention will be hereinafter fully set forth.

Figure 1:
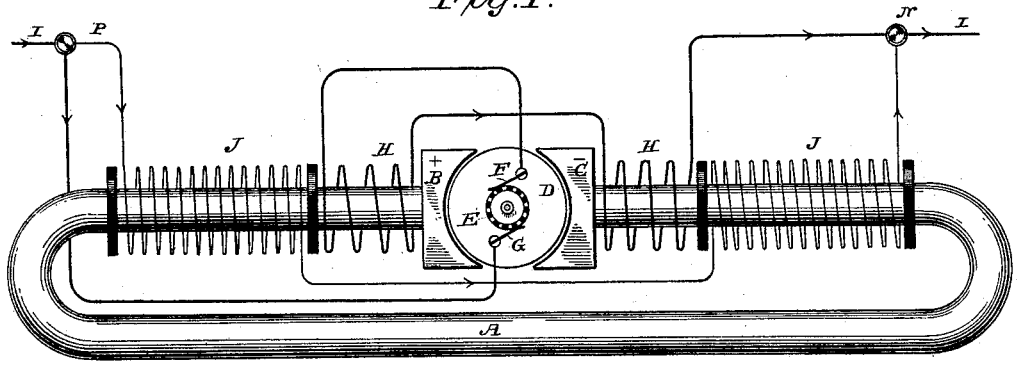
Figure 2:
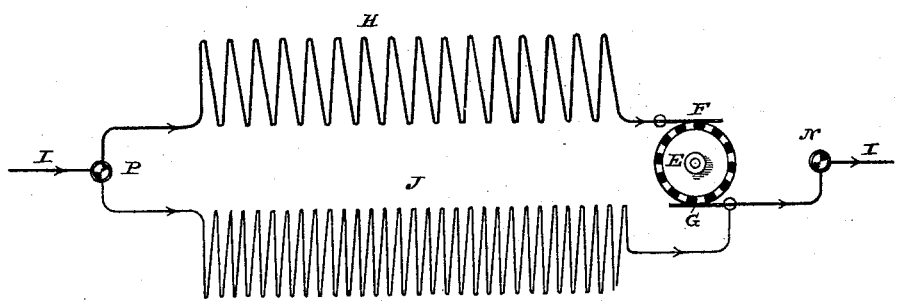

In the accompanying drawings, Figure 1 is a diagrammatic view of an electro-dynamic motor embodying my invention. Fig. 2 is a diagram of the winding alone.

Similar letters denote like parts throughout the views.

A represents the core of the field-magnet, B and C being the polar extensions thereof.

D is the armature; E, the commutator, and F and G the commutator-brushes.

H is a winding of comparatively coarse wire, which is connected in series with the main-line conductor I, starting from the positive binding-post P and extending to the commutator-brush G, thence into and out of the armature through commutator-brush F, around the field-magnet core A, and out to line by negative binding-post N. A secondary winding of finer wire, J, is then placed upon the field-magnets, its terminals being connected to the positive and negative binding-posts, placing it in shunt relation to the main field-magnet coils H and the armature. Both the coils H and J are so wound that they operate to magnetize the field-magnet with the same polarity.

My present invention is especially designed to produce a motor capable of being operated in series with other translating devices, and one that will run evenly and regularly at any required predetermined speed.

The operation of the motor while running in a circuit of constant current as furnished to translating devices run in series with each other—such as arc lights, &c.—is as follows: Supposing the motor to be placed in a circuit giving a constant current of, say, ten ampères, the current on starting will mainly pass through the armature and series coils H; but as the speed increases the amount of current passing through the shunt-coils J will gradually increase and magnetize the field-magnets with an increasing strength. The armature-speed will also increase until the counter electro-motive force has become so high as to cause still more current to flow through the shunt-coils, which will presently increase the strength of the field-magnet of the motor, while at the same time less current is flowing through the armature and series coils, with a corresponding diminution of the magnetism in the armature. The critical moment is reached when the current flowing through the shunt excites the field-magnets to such a point as to cause the armature to produce so much counter electro-motive force that the motor is on the point of becoming a generator. At this moment a balance exists between the supply and the motor; but if, now, we offer resistance to the rotation of the armature, its speed being slightly lowered, more current will flow through the armature and series-coils, while less current will pass through the shunt. The magnetism in the armature will increase while the field of force will be weakened. This reaction will lower the counter electro-motive force, so that the series helices H and the armature will receive more current, and hence produce more mechanical work.

The great advantage in this mode of regulating the speed of the motor is that the current flowing in the same direction in both helices, shunt and series, is used much more economically than in the case where a shunt is opposing a series winding, or vice versa. Another advantage is that in starting, both windings help in magnetizing the core A, and no circuit-reversing arrangements are needed, as in a differentially-wound self-regulating motor. The proportion between shunt and series varies with the speed required.

Having described my invention, what I claim, and desire to secure by Letters Patent, is—

1. In an electro-dynamic motor, the combination, with main field-magnet coils in series with the armature and working-conductor, of supplemental field-magnet coils of relatively-high resistance wound in such direction as to produce the same polarity as the main field-magnet coils, and permanently connected between the main binding-posts so as to constitute a shunt-circuit around the main field-magnet coils and armature, substantially as shown and described.

2. In an electric motor, the field-magnet cores wound with coils placed in series with the armature, and additional coils forming a shunt over the series coils and the armature, both series and shunt coils being permanently wound in such direction as to magnetize the field-magnet cores with the same polarity, substantially as described.

3. In an electric motor, two permanent windings on the field-magnet cores, both magnetizing the said core or cores with the same polarity, but with varying degrees of strength, for the purpose of regulating the speed and power of the motor, substantially as described.

4. In an electric motor, the field-magnet core or cores wound with two permanent independent circuits or helices, one in series with the armature of the motor, the other forming a shunt over the series circuit and the armature, both circuits or helices superposing their different strength in the same direction upon the cores of the motor field-magnets, in order to vary the magnetic strength of the field of force, in which the armature revolves, and thus to regulate the power and speed of the motor, substantially as described.

5. In an electric motor, two permanent windings on the field-magnet cores thereof, one in series with the armature and the other forming a shunt over the series winding and the armature, so disposed and proportioned that the counter electro-motive force produced in the armature on an abnormal speed will force sufficient current through the shunt-winding to strengthen the field of force and cause the armature to produce sufficient counter electro-motive force to prevent more current entering the motor-circuit, substantially as described.

In testimony whereof I hereto affix my signature in presence of two witnesses.

CHARLES J. VAN DEPOELE.

Witnesses:
EVERELL D. STILES,
PAUL BLATCHFORD.